United States Patent [19]

Henbest

[11] 4,172,057

[45] Oct. 23, 1979

[54] AMINO-RESIN COMPOSITIONS

[75] Inventor: Richard G. C. Henbest, Stockton-on-Tees, England

[73] Assignee: Imperial Chemical Industries Limited, London, England

[21] Appl. No.: 902,110

[22] Filed: May 2, 1978

[30] Foreign Application Priority Data

May 6, 1977 [GB] United Kingdom ............... 19081/77

[51] Int. Cl.$^2$ .......................... C08L 3/02; C08L 5/00; D21D 3/00
[52] U.S. Cl. .................... 260/17.3; 162/146; 162/147; 162/166
[58] Field of Search ................ 260/17.3; 162/166, 146

[56] References Cited

U.S. PATENT DOCUMENTS

| | | | |
|---|---|---|---|
| 2,674,517 | 4/1954 | Deniston | 260/17.3 |
| 2,998,344 | 8/1961 | Carlson | 162/166 |
| 3,070,487 | 12/1962 | Novak | 162/146 |
| 3,223,581 | 12/1965 | Sommer et al. | 162/146 |
| 3,594,271 | 7/1971 | Woodberry | 162/167 |
| 3,849,378 | 11/1974 | Griffiths | 162/166 |

OTHER PUBLICATIONS

Chem. Modification of Paper Making Fibers, Ward, p. 147.
Synthetic Paper from Fibers and Films, Halpern, pp. 158-159.

*Primary Examiner*—Edward M. Woodberry
*Attorney, Agent, or Firm*—Cushman, Darby & Cushman

[57] ABSTRACT

An amino-resin composition, in particular urea formaldehyde and/or melamine formaldehyde, in the form of fibres, having incorporated therein at least one additional compound which contains at least one aldehyde or ketone group and at least one hydroxyl group bonded to a carbon atom.

7 Claims, No Drawings

AMINO-RESIN COMPOSITIONS

The present invention relates to amino-resin compositions in the form of fibres, which are particularly useful, as fibrous materials for papermaking, either when used alone or, more especially, when used in admixture with cellulose fibres such as wood pulp.

In accordance with the present invention, there are provided amino-resin compositions in the form of fibres, comprising at least one amino-resin having incorporated therein at least one added compound which contains at least one aldehyde or ketone group and at least one hydroxyl group bonded to a carbon atom. In particular, the added compound(s) may be a carbohydrate or modified carbohydrate. Such amino-resin compositions in the form of fibres in accordance with the invention have the specific advantage of being self-adhesive when formed by conventional paper-making processes into papers, and show improved levels of adhesion to cellulose fibres when formed in admixture with them into papers.

Amino-resin

Suitable amino-resins for use in the invention are conventional formulations containing urea and/or melamine condensed with formaldehyde, and having molar ratios of formaldehyde: amino groups between 0.5:1 and 1.5:1, preferably between 0.6:1 and 1.2:1; minor amounts of other materials, e.g. phenol, resorcinol, cresol, thiourea, or lower aldehydes other than formaldehyde can be incorporated in the amino-resin.

Carbohydrates

Suitable carbohydrates include, for example:
1. Glycolaldehyde
2. Glyceraldehyde, dihydroxyacetone
3. Tetroses, e.g. erythrose, threose and ketoteroses
4. Pentoses, e.g. ribose, arabinose, xylose, lyxose and ketopentoses
5. Hexoses, e.g. glucose, fructose, sorbose, galactose, mannose, etc. (The above carbohydrates 1 to 5 occur in admixture, in varying degrees, in formose).
6. Di-saccharides, such as sucrose, lactose, maltose, cellobiose
7. Poly-and oligosaccharides, such as starch, modified or degraded starch (modified or degraded, for example, by hydrolysis, oxidation, or enzyme action), dextrins or degraded dextrins, and cellulose and products of its degradation or modification.
8. Chemically-modified carbohydrates, e.g. aminosugars, carbohydrate esters, etc. Mixtures of carbohydrate isomers and mixtures of different carbohydrates may be used.

Composition and preparation

The amino-resin component of the composition for making the fibres may be condensed by any of the methods well known in the art; typically, urea and/or melamine are dissolved in formalin and refluxed, first under neutral or slightly alkaline conditions, and subsequently under acid conditions. Supplementary additions of reactants can be made, and the resin can be concentrated by evaporation under reduced pressure.

The added compound(s), e.g. the carbohydrate(s), can be added, by dissolution or suspension in the resin medium before, during, or after the condensation stage. For some systems, it may be possible only to add the carbohydrate at the end of the condensation. From 1 to 50% by weight of carbohydrate, based on the total solids of the composition, may be used, preferably 5 to 30% by weight thereof.

Preparation of fibres from the amino-resin compositions

The fibres are conveniently prepared by air fibrillation, as described in our co-pending British Patent Application No. 51199/76 (corresponding to U.S. Ser. No. 857972); or by propelling a stream or streams of resin into a turbulent fluid (e.g. hot air or an acid bath) and causing its drying or gelation in the fluid. Alternatively the fibres may be formed by drawing the fibres in conventional manner into a curing medium (e.g. hot air or an acid bath); or by conventional wet or dry spinning into a fluid in which gelation or drying occurs (e.g. hot air or an acid bath). Conveniently, suitable fibres can be prepared by a centrifugal spinning process as described in our co-pending UK patent application No. 10405/77 (corresponding to U.S. Ser. No. 885344).

Curing of the fibres can be achieved by adding an acid (e.g. formic or sulphuric acid) or a salt of an acid, preferably an ammonium salt, to the resin, prior to forming the fibres, and/or by heating the fibres after their formation.

Pigments, dyes, brightening agents, fillers, etc., may be incorporated into the resin before forming the fibres.

Incorporation of fibres into paper

The fibres characteristically have a mean diameter of 0.5 to 50$\mu$ (preferably 1 to 30$\mu$) and an average length of 0.1 to 10 mm (preferably 0.2 to 5 mm).

The fibres may need to be reduced in length to that required for papermaking. This can be achieved by cutting, passing through rollers, milling, etc., or by wet disintegration as is well-known in the paper industry. The fibres should be adequately cured before being used for this purpose.

Advantages in paper

We have found that by using carbohydrate-modified UF fibres, better levels of adhesion are obtained than with unmodified UF fibres, leading to improved tensile and burst strengths. General advantages are also obtained (in comparison with conventional all-cellulose papers) in respect of drainage rates, bulk whiteness, and, particularly when used with short-fibred cellulose pulp, tear strength.

EXAMPLE 1

A commercially available UF resin, "Aerolite 300" (Regd. Trade Mark from CIBA-Geigy which contains about 65% by weight of UF resin solids in water) was used. To this was added D-glucose to give mixtures containing 7%, 13% and 24% by weight of dissolved glucose based on the total solids in the mixture. Samples of these, and of the original amino-resin, were adjusted to a viscosity of about 30 poise and air-fibrillated; amino-resin was fed vertically, at a rate of 13 ml/min, in a continuous thread, into the path of an air jet at right angles to the thread, the air jet being produced from a nozzle of area 8 mm$^2$ fed by air at 30 psig and at a rate of 300 standard cubic feet per hour. The fibres were blown into a chamber heated to 50° C. by hot air where they were stabilised and dried. They were then cured by heating at 120° C.; curing was assisted by the mixing of 1% of a 40% solution of ammonium sulphate into the amino-resin stream just before fibrillation.

Fibres of diameter about 10$\mu$ were produced. These were reduced in length to 2 to 3 mm. by a standard laboratory pulp disintegrator. Papers were made using the amino-resin fibres alone and in admixture with mechanical wood pulp. The burst indexes of the papers formed were as follows (in kPa.m²/gm):

| Paper Composition (by weight) | UF Resin Composition containing % by wt. of glucose based on total solids of composition | | | |
|---|---|---|---|---|
| | No glucose | 7% glucose | 13% glucose | 24% glucose |
| 100% UF | No adhesion | Adhesion | Adhesion | Adhesion |
| 20% UF : 80% mechanical pulp | 0.63 | 0.66 | 0.76 | 0.72 |
| 50% UF : 50% mechanical pulp | 0.30 | 0.30 | 0.42 | 0.42 |

Blends of the UF fibres (with or without glucose) and mechanical pulp drained faster than did mechanical pulp alone, and were whiter in colour.

EXAMPLE 2

A formose solution was prepared as follows: 1440 ml of formaline (36% HCHO, 5.6% methanol), 456 ml of water, 82 g of Ca(OH)$_2$ and 4 g of dextrose, were gently heated in a flask fitted with a reflux condenser. At a temperature of 55° C. heating was stopped, and an exotherm taking the mixture rapidly to 94° C. occurred. The formose solution so obtained was cooled, neutralised with 340 ml of 25% $^w$/v Na$_2$ CO$_3$ solution, and filtered. The filtrate was concentrated by evaporation under vacuum at 37° C.-40° C. to give a formose solution of approximately 37% concentration. Analysis showed a Ca content of 1250 ppm and a free formaldehyde content of 0.735% $^w$/v.

Using this formose solution, three different resins A, B and C were prepared as follows:

Resin A

The formose solution was concentrated to 40% formose. 250 parts of this were added to a mixture of 460 parts of formalin (36.5% formaldehyde, 6.5% methanol) and 193 parts of urea (molar ratio of formaldehyde: urea 1.75:1, formose content 20% by weight based on total solids of the mixture). The mixture was refluxed for 15 minutes adjusted to pH 4.85 (by the addition of formic acid solution) and further refluxed for 68 minutes. The solution was adjusted to pH 5.5 (by the addition of NaOH solution), cooled to 40° C. and further adjusted to pH 7.5. The resin was concentrated by vacuum evaporation at 42°-48° C. to give a resin (Resin A) of viscosity 11 poise.

Resin B

Part of resin A, prepared as above, was concentrated by further vacuum evaporation to 35 poise viscosity, and blended with an equal amount of a conventional UF resin of similar viscosity to give a resin (resin B) containing 10% by weight formose based on the total solids of the blend. The resin used for blending was prepared by a conventional process (neutral reaction followed by acid condensation, then evaporation) with a formaldehyde: urea ratio of 1.95:1.

Resin C

The formose solution, prepared as above, was concentrated to 50% formose. 300 parts of this solution was added to a mixture 220.5 parts of urea and 460 parts of formalin (as used for making Resin A). The mixture was adjusted to pH 7, refluxed for 15 mins, and then acidified to pH 4.85 (by the addition of formic acid solution) and refluxed for a further 55 minutes. The mixture was then part-neutralised, cooled, and brought to pH 7.5 by the addition of NaOH solution. It was then vacuum-evaporated at 48°-50° C. to give a resin of viscosity 100 poise. The formose content of the resin was 30% by weight, based on the total solids of the mixture.

Fibres were prepared from Resins A, B and C. The method of fibre preparation was by air fibrillation, as described in Example 1. Resin A was used without further modification, while Resin B and Resin C were adjusted to a viscosity for about 30 poise by adding water. A catalyst solution of ammonium sulphate was added as described in Example 1.

Papers containing the novel fibres and mechanical pulp were prepared and tested in a standard manner, as described in Example 1. The properties measured were as follows:

| | Burst index of paper (kPa.m²/gm) | |
|---|---|---|
| | with 80% by weight mechanical pulp | with 50% by weight mechanical pulp |
| Fibres from Resin A (containing 20% formose) | 0.81 | 0.75 |
| Fibres from Resin B (containing 10% formose) | 0.63 | 0.64 |
| Fibres from Resin C (containing 30% formose) | 0.76 | 0.69 |
| Comparison:- unmodified UF fibres | | |

EXAMPLE 3

D-Glucose and soluble starch were added to "Aerolite 300" resin to give a muxture containing 14.5% D-Glucose and 1.5% of starch. This was converted to fibres by the air fibrillation method described in Example 1, and cured for 3 hours at 120° C. The fibres were disintegrated and made into paper samples using the procedure of Example 1. Mechanical pulp was again used as the cellulose component.

The burst indexes of the paper made were measured as follows:

20% modified UF fibre: 80% mechanical pulp 0.79 kPa.m²/gm

50% modified UF fibre: 50% mechanical pulp 0.44 kPa.m²/gm

EXAMPLE 4

A series of modified urea formaldehyde resins were fibrillated by centrifugal spinning (as described in our co-pending British patent application No. 10405/77 which corresponds to U.S. Ser. No. 885344) using the following conditions.

A rotating cup of diameter 75 mm was used with 24 holes, each of 3 mm diameter, in the periphery. The device was rotated at 4,500 rpm and resin fed to the centre of the device at a rate of 78 g/min. A catalyst solution was continuously metered and mixed into the resin at a rate of 6.2 g/min; the catalyst solution consisted of a 2:1 mixture by volume of a b 2.5% by weight solution of polyethylene oxide in water and a 20% by weight solution of ammonium sulphate in water. The fibres were spun into hot air at a temperature of 70° C., were dried, collected and cured for 3 hours at 120° C. They were disintegrated, as before, in a laboratory disintegrator and made into paper on a standard handsheet former. The fibres all produced self-adhering paper using the British Standard procedure (as set out in 'A Laboratory Handbook of Pulp and Paper Manufacture' by J. Grant, Arnold, 1942, p 78). By comparison, an unmodified urea formaldehyde fibre (from "Aerolite 300") did not. The following mixtures were used:

A. "Aerolite 300", with 13.5% by wt. D-fructose added, based on total solids

B. "Aerolite 300", with 13.5% by wt. maltose added, based on total solids

C. "Aerolite 300", with 18% by wt. maltose added, based on total solids

D. "Aerolite 300", with 20% by wt. malto-dextrin added, based on total solids ("Snowflake" malto-dextrin from CPC, United Kingdom Limited). The malto-dextrin is prepared from starch and consists of a mixture of maltose oligomers.

I claim:

1. An amino-resin composition in the form of fibres comprising an amino-resin selected from the group consisting of urea-formaldehyde resins, melamineformaldehyde resins and mixtures thereof, having a molar ratio of formaldehyde: amino groups in the range 0.5:1 to 1.5:1 having incorporated therein from 5% to 30%, by weight based on the weight of the total solids in the composition, of at least one added compound which contains at least one group selected from the group consisting of aldehyde and ketone groups and at least one hydroxyl group bonded to a carbon atom.

2. An amino-resin composition as claimed in claim 1, wherein the said ratio is in the range 0.6:1 and 1.2:1.

3. An amino-resin compostion in the form of fibres as claimed in claim 1, wherein said at least one added compound is selected from the group consisting of carbohydrates, modified carbohydrates, carbohydrate isomers and mixtures thereof.

4. An amino-resin composition in the form of fibres as claimed in claim 1, wherein said at least one added compound is selected from the group consisting of glycolaldehyde, glyceraldehyde, dihydroxyacetone, tetroses, pentoses, hexoses, disaccharides, polysaccharides, oligosaccharides, and mixtures thereof.

5. An amino-resin composition in the form of fibres as claimed in claim 1, wherein the added compound is formose.

6. An amino-resin composition in the form of fibres as claimed in claim 1, wherein said at least one added compound is selected from the group consisting of glucose, fructose, maltose, malto-dextrin, and mixtures thereof.

7. Paper containing fibres as claimed in claim 1.

* * * * *